United States Patent
Nishida

(10) Patent No.: US 9,370,818 B2
(45) Date of Patent: Jun. 21, 2016

(54) BEAD RING WINDING DEVICE

(75) Inventor: Kihachiro Nishida, Hashima (JP)

(73) Assignee: Fuji Shoji Co., Ltd., Gifu-ken (JP)

( * ) Notice: Subject to any disclaimer, the term of this patent is extended or adjusted under 35 U.S.C. 154(b) by 0 days.

(21) Appl. No.: 14/381,136

(22) PCT Filed: Mar. 28, 2012

(86) PCT No.: PCT/JP2012/058251
§ 371 (c)(1),
(2), (4) Date: Aug. 26, 2014

(87) PCT Pub. No.: WO2013/145192
PCT Pub. Date: Oct. 3, 2013

(65) Prior Publication Data
US 2015/0020913 A1    Jan. 22, 2015

(51) Int. Cl.
*B21F 37/00* (2006.01)
*B29D 30/48* (2006.01)

(52) U.S. Cl.
CPC ............... *B21F 37/00* (2013.01); *B29D 30/48* (2013.01); *B29D 2030/487* (2013.01)

(58) Field of Classification Search
CPC .. B29D 30/48; B29D 2030/487; B21F 37/00; B21F 3/00
See application file for complete search history.

(56) References Cited

U.S. PATENT DOCUMENTS 3,881,526 A    5/1975 Bell et al.

FOREIGN PATENT DOCUMENTS

| CN | 201543752 U | 8/2010 |
|---|---|---|
| JP | 53-15019 B2 | 5/1978 |
| JP | 55-81140 A | 6/1980 |
| JP | 2009-12212 A | 1/2009 |
| JP | 2009-12326 A | 1/2009 |
| SU | 1353663 A1 | 11/1987 |

OTHER PUBLICATIONS

English translation of the International Preliminary Report on Patentability for PCT/JP2012/058251 dated Oct. 1, 2014.
Translation of Office Action corresponding to Chinese Patent Application No. 201280070211.1, dated Dec. 25, 2015.
Translation of Office Action corresponding to Russian Patent Application No. 2014142866/05(069242), dated Mar. 28, 2012.

*Primary Examiner* — Teresa M Ekiert
(74) *Attorney, Agent, or Firm* — Kilpatrick Townsend & Stockton LLP

(57) ABSTRACT

A bead ring winding device includes a traverse mechanism (12) formed of a rotary body (21), a traverse roller (35), and an air cylinder (44). The rotary body (21) is rotatable about a rotary shaft and has an outer circumferential surface provided with an annular winding unit (23) for wire winding. The traverse roller (35) makes a fit to a wire (W) wound by the winding unit (23) to align turns of the wire (W) in juxtaposition in a direction in which the rotary shaft extends. The air cylinder (44) applies biasing force to the traverse roller (35) in a direction in which the wire (W) is pressed. The winding unit (23) has a bottom surface of a tapered shape. The traverse mechanism (12) includes a cam member (63) having a sloping cam surface (63a). The sloping cam surface (63a) guides the traverse roller (35) such that the traverse roller (35) traverses parallel to a tapered surface (24a) of the winding unit (23).

5 Claims, 4 Drawing Sheets

BEAD RING WINDING DEVICE

FIELD OF THE INVENTION

This invention relates to a bead ring winding device applied for example for manufacture of vehicle tires and intended to form a bead ring by winding a wire.

BACKGROUND OF THE INVENTION

Patent Document 1 discloses an example of a suggested structure of a conventional bead ring winding machine of this type. In this conventional structure, an annular recessed part used for winding a wire in rows and in tiers is formed in the outer circumferential surface of a bead former rotatable about a shaft.

According to an embodiment described in Patent Document 1, a pitch-feeding roller is arranged over the bead former and the pitch-feeding roller is rotatably supported by a supporting unit. The supporting unit is supported by a guide member such as a rail and is movable in a direction perpendicular to a feeding direction of a wire. The pitch-feeding roller moves one pitch (corresponding to the size of the wire) at a time in the direction perpendicular to the feeding direction of the wire.

However, according to the structure of Patent Document 1, a bottom surface of the recessed part in the bead former is parallel to the shaft of the bead former. This disables formation of a tapered bead ring by winding.

PRIOR ART DOCUMENTS

Patent Documents

Patent Document 1: Japanese Laid-Open Patent Publication No. 2009-12326

SUMMARY OF THE INVENTION

It is an object of this invention to provide a bead ring winding device capable of forming a tapered bead ring stably by winding without causing irregular winding of a wire.

To solve the aforementioned problem, one aspect of this invention provides a bead ring winding device including a rotary body rotatable about a rotary shaft and a traverse mechanism that makes a traverse roller and a biasing member traverse. The rotary body has an outer circumferential surface provided with an annular winding unit for wire winding. The traverse roller makes a fit to a wire wound by the winding unit to align turns of the wire in juxtaposition in a direction in which the rotary shaft extends. The biasing member applies biasing force to the traverse roller acting in a direction in which the wire is pressed. In this bead ring winding device, the winding unit has a tapered bottom surface and a shaft of the traverse roller is parallel to the tapered surface of the winding unit.

In the aforementioned bead ring winding device, it is preferable that the traverse mechanism includes a guiding unit that guides the traverse roller such that the traverse roller traverses parallel to the tapered surface of the winding unit.

In the aforementioned bead ring winding device, it is preferable that the traverse roller is supported on one end portion of a stay and a roller to move on a sloping surface parallel to the tapered surface is provided to the other end portion of the stay.

It is preferable that the aforementioned bead ring winding device includes a supporting table and an actuator. The supporting table has the sloping surface as an upper surface. The actuator is provided to move up and down the supporting table.

In the aforementioned bead ring winding device, it is preferable that alignment grooves for alignment of turns of the wire are provided in a bottom of the winding unit.

In the aforementioned bead ring winding device, it is preferable that the stay includes an adjusting unit to adjust the position of the traverse roller in the direction in which the rotary shaft of the rotary body extends.

The bead ring winding device of this invention includes the traverse roller that aligns turns of the wire in juxtaposition in the winding unit provided in the outer circumferential surface of the rotary body. The bottom surface of the winding unit is a tapered surface and the shaft of the traverse roller is parallel to the tapered surface of the winding unit. Accordingly, the traverse roller is made to traverse along the tapered surface of the winding unit. Thus, while winding of the wire proceeds, the pressing force applied from the traverse roller on the wire is maintained. This can form a tapered bead ring stably by winding without causing irregular winding of the wire.

DETAILED DESCRIPTION OF THE PREFERRED EMBODIMENTS

An embodiment of a bead ring winding device that embodies this invention is described below by referring to FIGS. 1 to 5.

Figure 1:
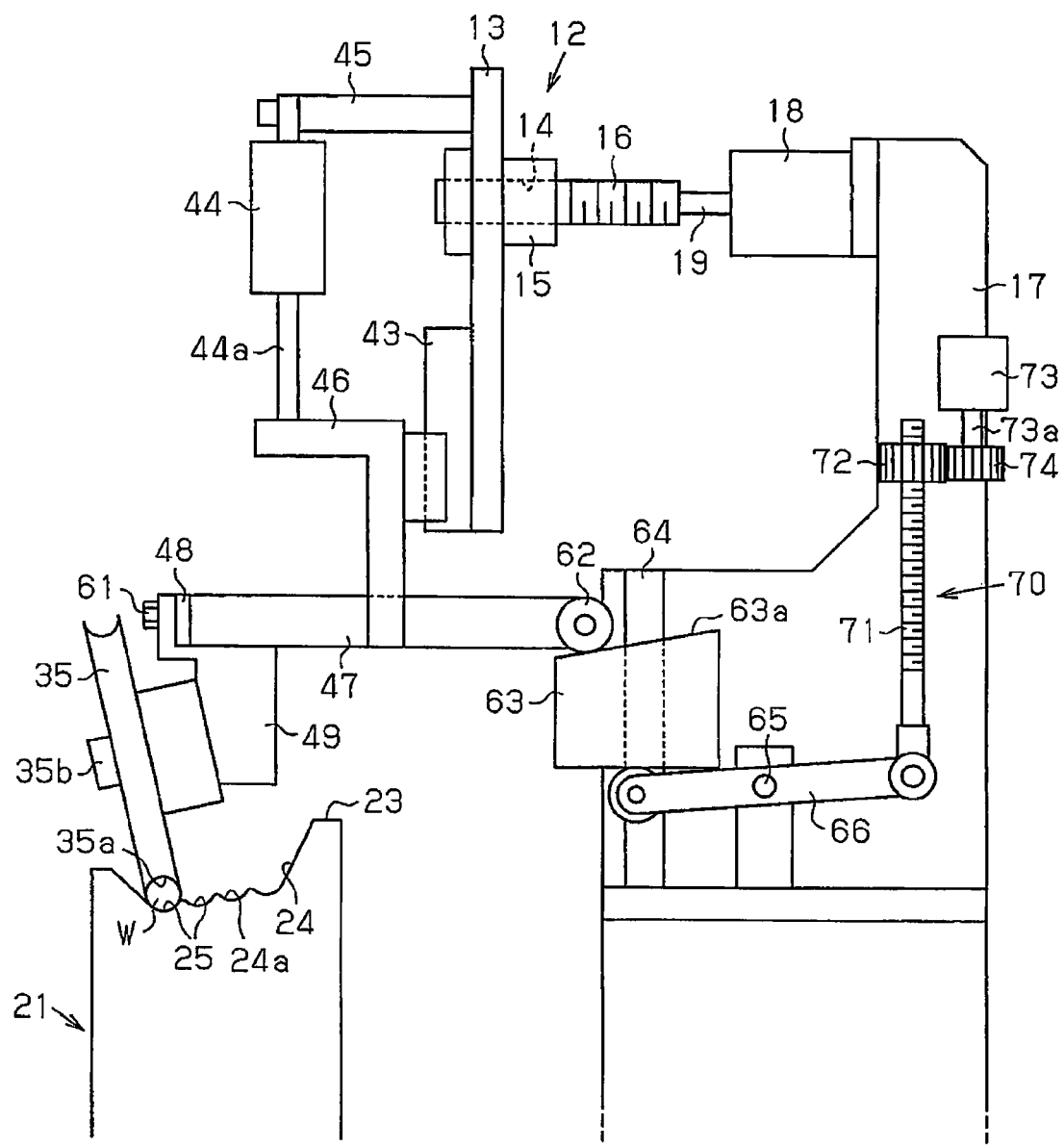
FIG. 1 is a front view showing a traverse mechanism and its neighborhood of a bead ring winding device in an enlarged manner according to an embodiment of this invention.
Figure 2:
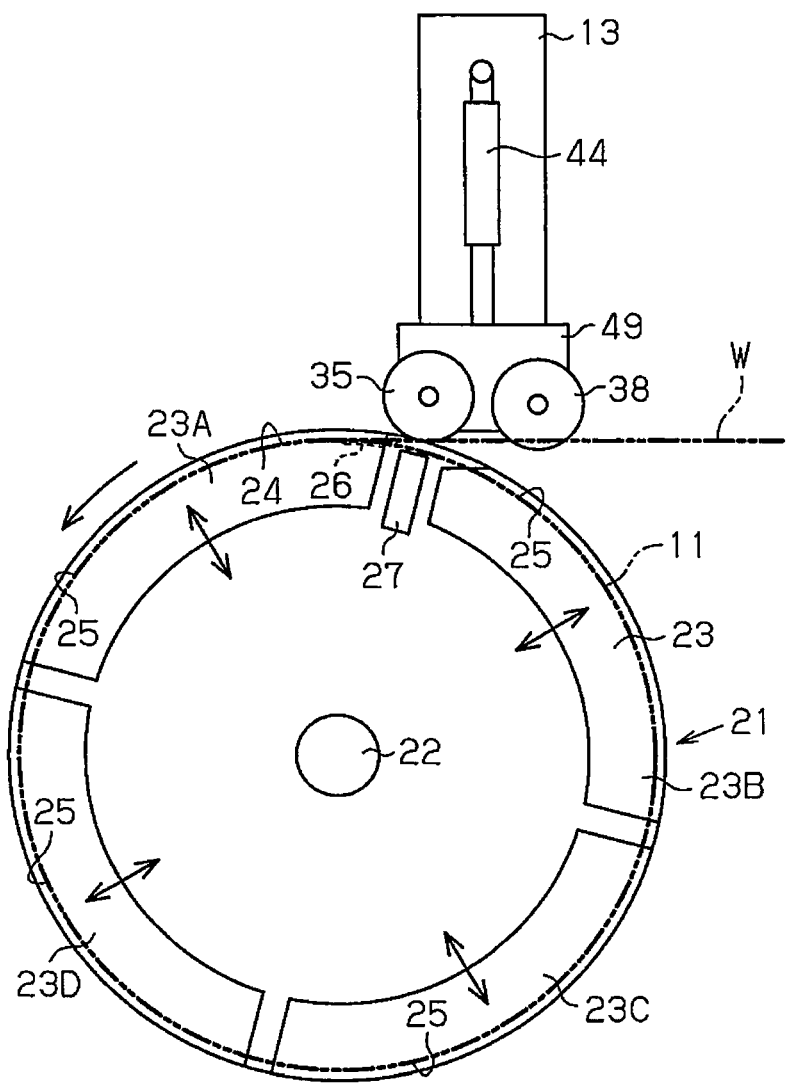
FIG. 2 is a side view of a rotary mechanism of a rotary body in the bead ring winding device.
Figure 3:
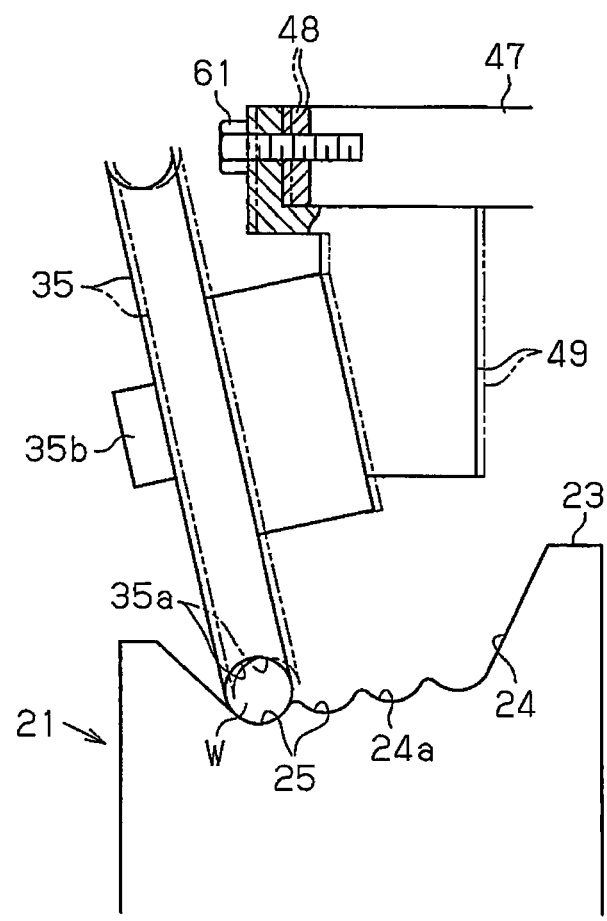
FIG. 3 is a front view showing a traverse mechanism realized by a traverse roller on the rotary body.
Figure 4:
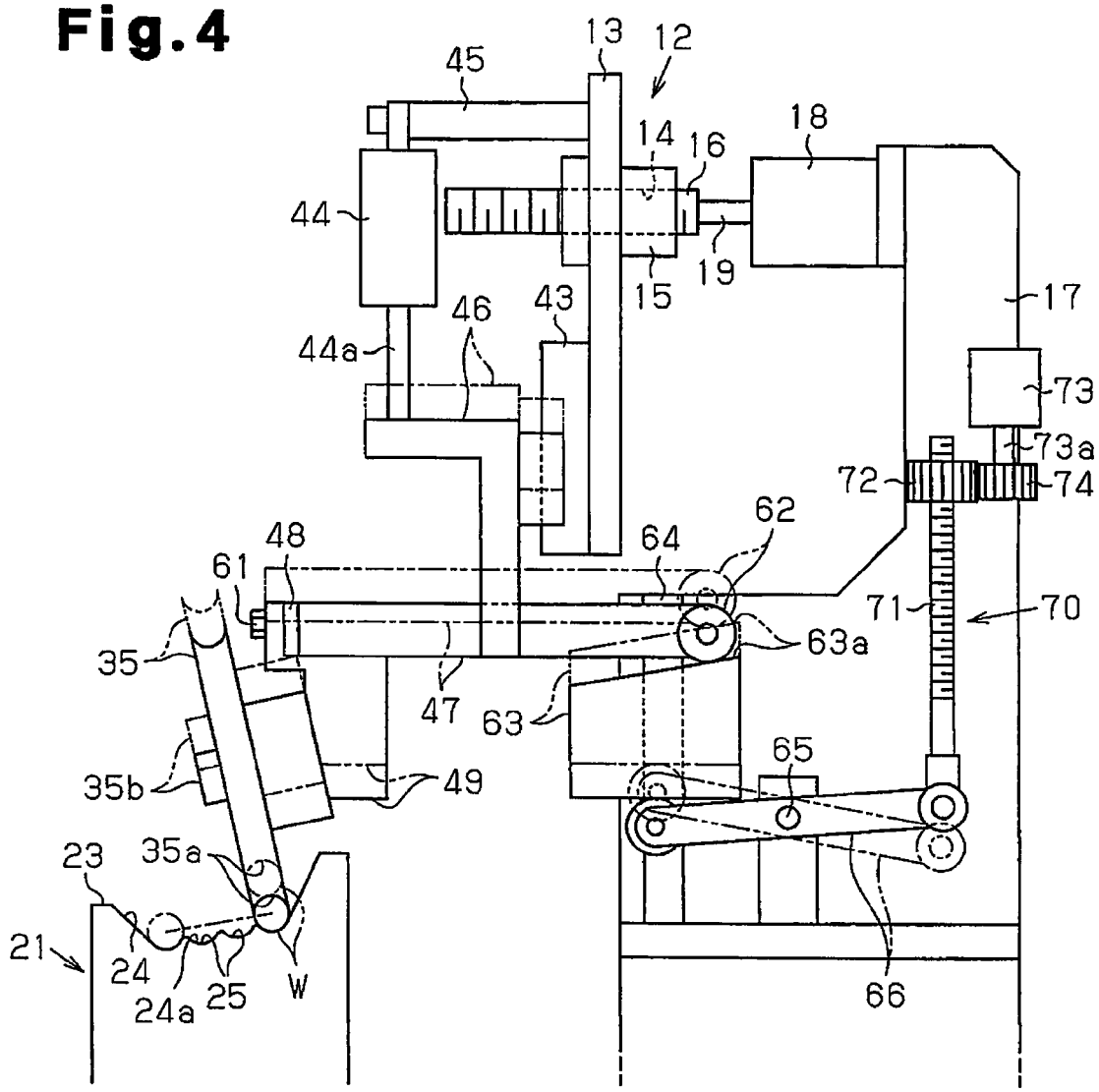
FIG. 4 is a front view showing an operation of the bead ring winding device.

As shown in FIG. 2, a rotary body 21 is supported relative to a frame 17 (see FIG. 1) of the winding device such that the rotary body 21 can rotate about a rotary shaft (horizontal shaft) 22. An annular winding unit 23 used for winding a wire W is formed in the outer circumferential surface of the rotary body 21. The winding unit 23 is divided in a circumferential direction. The winding unit 23 is formed of multiple partitioned members 23A to 23D supported such that the partitioned members 23A to 23D can move in the radial direction of the rotary body 21. The wire W is formed by covering the outer circumferential surface of a metallic wire with rubber, for example.

Figure 5:
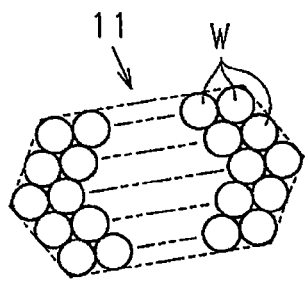
FIG. 5 is an explanatory view of a bead ring formed by winding a wire.

As shown in FIGS. 1 and 2, the outer circumferential surface of each of the partitioned members 23A to 23D is provided with a recessed part 24 of a substantially inverted trapezoidal shape in cross section. The recessed part 24 is used for winding the wire W in rows and in tiers to form a bead ring 11. The bottom surface of the recessed part 24 is a tapered surface 24a. The tapered surface 24a is tapered at an angle for example of 15 degrees relative to the rotary shaft 22 of the rotary body 21. As shown in FIG. 5, the bead ring 11 stacked by winding in the recessed part 24 is formed into a tapered hexagonal shape in cross section. The bottom of the recessed part 24 of each of the partitioned members 23A to 23D is provided with multiple alignment grooves 25 substantially semicircular in cross section in which turns of the wire W in the innermost circumference are guided and aligned at regular intervals. The tapered surface 24a corresponds to a surface with a succession of the bottoms of the alignment grooves 25 or a surface with a succession of the apexes of the alignment grooves 25.

As shown in FIG. 2, the rotary body 21 is provided with a clamp 27 by which an end part of the wire W is clamped where winding of the wire W starts. The clamp 27 is positioned between the partitioned member 23A and the partitioned member 23B adjacent to the partitioned member 23A.

As shown in FIG. 1, a traverse mechanism 12 with a supporting plate 13 is provided above the rotary body 21. A tubular body 15 with a female screw 14 is fixed to the supporting plate 13. A screw shaft 16 is inserted in the female screw 14 and is coupled to a motor shaft 19 of a motor 18 fixed to the frame 17. In response to rotational drive by the motor 18, the screw shaft 16 is inserted into the female screw 14 or disengaged from the female screw 14 while the screw shaft 16 rotates. This moves the supporting plate 13 to the left or to the right of FIG. 1, so that a traverse roller 35 moves back and forth in a direction in which the rotary shaft 22 extends. The outer circumferential surface of the traverse roller 35 is provided with a groove part 35a in which the wire W is guided to a given position in the recessed part 24. A mechanism not shown in the drawings intended to prevent rotation of the supporting plate 13 around the screw shaft 16 is provided between the frame 17 and the supporting plate 13.

A guide rail 43 is provided to project from a lower end potion of the supporting plate 13. An upper bracket 45 supporting an air cylinder 44 as a biasing member is fixed to the supporting plate 13. A lower bracket 46 is fixed to a piston rod 44a of the air cylinder 44. The lower bracket 46 is supported such that the lower bracket 46 can make sliding motion in the vertical direction relative to the guide rail 43.

A stay 47 is fixed to the lower bracket 46. An upper end portion of an attaching member 49 is attached to a left end portion of the stay 47 with a bolt 61 through a spacer 48 functioning as an adjusting unit. The traverse roller 35 is rotatably supported relative to the attaching member 49. The traverse roller 35 is arranged such that a shaft 35b of the traverse roller 35 becomes parallel to the tapered surface 24a of the recessed part 24. The spacer 48 can be attached to and detached from the left end portion of the stay 47. Thus, by exchanging the spacer 48 to a spacer of a different thickness, the position of the traverse roller 35 and that of the recessed part 24 of the rotary body 21 relative to each other can be adjusted finely in the direction in which the rotary shaft 22 extends as shown by the alternate long and two short dashed lines of FIG. 3.

The traverse roller 35 can be placed in a lower operative position where the traverse roller 35 fits the wire W and an upper inoperative position where the traverse roller 35 is separated from the wire W. During winding of the wire W with the winding unit 23, the traverse roller 35 is moved to the operative position by the sticking out of the air cylinder 44. The traverse mechanism 12 is formed of the motor 18, the screw shaft 16, the female screw 14, the supporting plate 13, and the like.

A roller 62 functioning as a cam follower forming a guiding unit is rotatably supported at a right end portion of the stay 47. The roller 62 is formed such that the roller 62 moves on a cam member 63 as a supporting table. The upper surface of the cam member 63 is a sloping cam surface 63a as a sloping surface. The sloping cam surface 63a forms a guiding unit parallel to the tapered surface 24a of the recessed part 24 in the winding unit 23 of the rotary body 21. The cam member 63 is supported by a guide rail 64 such that the cam member 63 can make sliding motion in the vertical direction.

The frame 17 is provided with a lever member 66 to make motion about a pivot 65. One of the opposite ends of the lever member 66 supports the cam member 63 through a roller and the other end is connected to a lower end portion of a screw bar 71. The screw bar 71 forms a screw-feeding mechanism 70 functioning as an actuator. A screw not shown in the drawings formed in the inner circumferential surface of a first gear 72 is in meshing engagement with an upper portion of the screw bar 71. The rotation of the first gear 72 moves down the screw bar 71 to tilt the lever member 66, thereby moving up the cam member 63. The first gear 72 is in meshing engagement with a second gear 74 coupled to a rotary shaft 73a of a motor 73. The rotation of the motor 73 rotationally drives the first gear 72. The first gear 72 is supported on the frame 17 through a supporting member not shown in the drawings.

As shown in FIG. 2, a guide roller 38 is supported by the attaching member 49 such that the guide roller 38 can rotate about a horizontal axis line. The guide roller 38 is adjacent to the traverse roller 35 and on an upstream side relative to the traverse roller 35 in a direction in which the wire W travels. The outer circumferential surface of the guide roller 38 is provided with a guide groove part not shown in the drawings in which the wire W is guided to the traverse roller 35. In response to the movement of the supporting plate 13 in the direction in which the rotary shaft 22 extends, the traverse roller 35 and the guide roller 38 move together in the same direction.

The operation of the aforementioned bead ring winding device is described next.

When the bead ring winding device starts to operate, an end part of the wire W where winding of the wire W starts is guided into the guide groove part of the guide roller 38 and clamped by the clamp 27. At this time, the traverse roller 35 has been moved to a position shown in FIG. 1 where the winding is to be started. Then, the air cylinder 44 sticks out to move down the traverse roller 35 to the operative position, so that the wire W is fitted in the groove part 35a of the traverse roller 35. The guide groove part of the guide roller 38 is formed deeply. Accordingly, moving the guide roller 38 up and down moves the wire W up and down relatively inside the guide groove part.

In this condition, the rotary body 21 is rotated in the anticlockwise direction of FIG. 2 to wind the wire W into the recessed part 24 of the winding unit 23. At this time, the traverse roller 35 receives the biasing force of the air cylinder 44 acting in a direction in which the piston rod 44a sticks out. Thus, the wire W is guided to the traverse roller 35 by the guide roller 38 and is positioned in a certain alignment groove 25 in the recessed part 24 while being pressed by the traverse roller 35. Accordingly, while the innermost circumference (first tier) of the wire W is wound into the recessed part 24 of the winding unit 23, turns of the wire W are aligned in juxtaposition at regular intervals along the alignment grooves 25 of the recessed part 24.

Specifically, each time the wire W is wound substantially one turn, the screwing action of the female screw 14 and the screw shaft 16 generated by the rotation of the motor 18 moves the traverse roller 35 and the guide roller 38 one winding pitch of the wire W at a time in the direction in which the rotary shaft 22 extends. Accordingly, after the wire W is wound substantially one turn along one alignment groove 25, the wire W is fed by one pitch to a next alignment groove 25 smoothly. At the same time, as shown in FIG. 1, the roller 62 makes rolling motion on the sloping cam surface 63a of the cam member 63. This moves up the traverse roller 35 along the sloping cam surface 63a, specifically along the tapered surface 24a of the recessed part 24 of the winding unit 23. When winding of the wire W in the first tier is finished, the traverse roller 35 moves to a position indicated by the solid lines of FIG. 4. Accordingly, the traverse roller 35 presses the wire W with pressing force that is substantially the same from start of winding in one tier until end of the winding in this tier.

When the winding of the wire W in the innermost circumference (first tier) is finished, the wire W is wound and stacked in order in a second tier and in subsequent tiers outside the innermost circumference. Each time winding in two tiers is finished, for example, the screw bar 71 of the screw-feeding mechanism 70 moves down. This turns the lever member 66 about the pivot 65, so that the lever member 66 lifts the cam member 63 as shown by alternate long and two short dashed lines of FIG. 4. This makes upward sliding motion of the stay 47 of the traverse mechanism 12 through the roller 62 to move up the traverse roller 35 accordingly. As a result, while the wire W is wound and stacked in the second tier and in the subsequent tiers, the pressing force applied from the traverse roller 35 on the wire W generated by the air cylinder 44 is maintained substantially the same as that applied during winding of the wire W in the first tier.

While the wire W is wound and stacked in the second tier and in the subsequent tiers, the traverse roller 35 is made to traverse by the motor 18 and is moved up and down along the tapered shape of the recessed part 24. Accordingly, turns of the wire W are guided and aligned in the recessed part 24 and are pressed from above to contact tightly with the wire W in a lower tier. As a result, the bead ring 11 of a tapered hexagonal shape such as one shown in FIG. 5 is obtained.

After the wire W is wound in predetermined rows and in predetermined tiers to form the bead ring 11, the wire W is cut by a cutting mechanism not shown in the drawings. The wire W is tied at a termination part in a next step. Next, the bead ring 11 is held by a holding unit not shown in the drawings and is then transferred to a subsequent step.

Accordingly, this embodiment achieves the effects as follows.

(1) The shaft 35b of the traverse roller 35 is parallel to the tapered surface 24a of the recessed part 24 of the winding unit 23. This enables stacking of the wire W without causing positional shift from the tapered surface 24a of the recessed part 24, thereby preventing irregular winding. Additionally, the wire W can be wound at higher speed.

(2) The traverse roller 35 to traverse is guided along the tapered surface 24a of the winding unit 23 by the sloping cam surface 63a parallel to the tapered surface 24a. This allows the traverse roller 35 to press turns of the wire W aligned at regular intervals with substantially uniform force. Thus, winding collapse of the wire W is prevented, thereby forming the high-quality bead ring 11 by winding.

(3) In response to increase in the number of winding tiers of the wire W, the cam member 63 moves up to move up the traverse roller 35. Thus, even with the increase in the number of winding tiers of the wire W, the pressing force from the traverse roller 35 on the wire W can still be maintained substantially uniform. This prevents irregular winding of the wire W, so that the bead ring 11 can be formed by stable winding and stacking.

(4) In response to progress of the winding and stacking of the wire W, the position of the traverse roller 35 can be made higher by moving up the cam member 63. Thus, even with change in the number of tiers of the wire W, the pressing force from the traverse roller 35 can still be maintained substantially constant, thereby preventing irregular winding and the like.

(5) The traverse roller 35 is formed such that the traverse roller 35 aligns turns of the wire W in the alignment grooves 25 by means of the traverse mechanism 12 and to press the wire W against the alignment grooves 25 by means of the air cylinder 44 functioning as a biasing member. As a result, turns of the wire W can be aligned in good order.

(6) The spacer 48 is provided between the stay 47 and the attaching member 49 for attachment of the traverse roller 35 to the stay 47. The spacer 48 is to adjust the position of the traverse roller 35 in the direction in which the rotary shaft 22 of the rotary body 21 extends. Accordingly, exchanging the spacer 48 facilitates adjustment of the position of the winding unit 23 of the rotary body 21 and that of the traverse roller 35 relative to each other.

This embodiment can be modified as follows.

The air cylinder 44 may be formed of multiple cylinders in accordance with the number of tiers of the bead ring 11 formed by winding and stacking.

The lever member 66 to turn about the pivot 65 may be omitted. Further, the screw bar 71 of the screw-feeding mechanism 70 may be arranged below the cam member 63 and the cam member 63 may be lifted directly by the screw bar 71. Alternatively, the cam member 63 may be lifted directly by a combination of a servomotor and a ball screw.

To stack the wire W in tiers more effectively, the air cylinder 44 may be placed at right angles relative to the tapered surface 24a of the winding unit 23.

The alignment grooves 25 in the recessed part 24 and the groove part 35a of the traverse roller 35 may be changed to a cornered shape such as a triangular shape or a rectangular shape in cross section.

The bottom surface of the recessed part 24 of the winding unit 23 may be changed to a flat surface by omitting the alignment grooves 25 in the recessed part 24.

The cam member 63 may be fixed to the frame 17 so that the lever member 66 and the screw-feeding mechanism 70 may be omitted, for example. In this case, in response to progress of the winding and stacking of the wire W, the piston rod 44a is depressed into the air cylinder 44.

The invention claimed is:

1. A bead ring winding device, comprising a rotary body rotatable about a rotary shaft and a traverse mechanism that makes a traverse roller and a biasing member traverse, the rotary body having an outer circumferential surface provided with an annular winding unit for wire winding, the traverse roller making a fit to a wire wound by the winding unit to align turns of the wire in juxtaposition in a direction in which the rotary shaft extends, the biasing member applying biasing force to the traverse roller acting in a direction in which the wire is pressed, wherein the winding unit has a tapered bottom surface,
the tapered bottom surface is tapered at an angle relative to the rotary shaft of the rotary body, and
a shaft of the traverse roller is parallel to the tapered bottom surface of the winding unit,
wherein the traverse roller is supported on one end portion of a stay and a roller to move on a sloping surface parallel to the tapered bottom surface is provided to the other end portion of the stay.

2. The bead ring winding device according to claim 1, wherein the traverse mechanism includes a guiding unit that guides the traverse roller such that the traverse roller traverses parallel to the tapered bottom surface of the winding unit.

3. The bead ring winding device according to claim 1, comprising a supporting table and an actuator, the supporting table having the sloping surface as an upper surface, the actuator being provided to move up and down the supporting table.

4. The bead ring winding device according to claim 1, wherein alignment grooves for alignment of turns of the wire are provided in a bottom of the winding unit.

5. The bead ring winding device according to claim 1, wherein the stay includes an adjusting unit to adjust the position of the traverse roller in the direction in which the rotary shaft of the rotary body extends.

* * * * *